United States Patent
Fukasawa et al.

(10) Patent No.: US 6,564,245 B1
(45) Date of Patent: *May 13, 2003

(54) PROCESSING SYSTEM AND APPARATUS FOR PERFORMING AN INQUIRY PROCESS IN ACCORDANCE WITH A TYPE OF SHARED OPERATION AND A TARGET USER

(75) Inventors: Toshihiko Fukasawa, Machida (JP); Hiroshi Okazaki, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/680,864

(22) Filed: Jul. 16, 1996

(30) Foreign Application Priority Data

Jul. 18, 1995 (JP) .............................. 7-181690

(51) Int. Cl.[7] .......................... G06F 15/16; H06F 9/46
(52) U.S. Cl. ........................ 709/205; 709/318
(58) Field of Search ................. 345/331; 830/3; 709/204, 205, 203, 206, 207, 227, 217, 218, 328

(56) References Cited

U.S. PATENT DOCUMENTS

| | | | | |
|---|---|---|---|---|
| 5,107,443 A | * | 4/1992 | Smith et al. ................ | 345/331 |
| 5,111,288 A | * | 5/1992 | Blackshear ................ | 348/143 |
| 5,337,407 A | * | 8/1994 | Bates et al. ................ | 345/331 |
| 5,371,852 A | * | 12/1994 | Attanasio et al. ........... | 709/245 |
| 5,375,068 A | * | 12/1994 | Palmer et al. .............. | 709/204 |
| 5,392,400 A | * | 2/1995 | Berkowitz et al. .......... | 709/203 |
| 5,434,913 A | * | 7/1995 | Tung et al. ................. | 709/204 |
| 5,452,299 A | * | 9/1995 | Thessin et al. .............. | 370/260 |
| 5,488,686 A | * | 1/1996 | Murphy et al. ............. | 709/205 |
| 5,490,247 A | * | 2/1996 | Tung et al. ................. | 709/204 |
| 5,539,886 A | * | 7/1996 | Aldred et al. ............... | 709/304 |
| 5,557,725 A | * | 9/1996 | Ansberry et al. ........... | 709/205 |
| 5,574,934 A | * | 11/1996 | Mirashrafi et al. .......... | 709/207 |
| 5,594,495 A | * | 1/1997 | Palmer et al. ................ | 348/17 |
| 5,649,105 A | * | 7/1997 | Aldred et al. ................ | 709/204 |
| 5,724,508 A | * | 3/1998 | Harple, Jr. et al. ......... | 709/205 |
| 5,937,166 A | | 8/1999 | Fukasawa .............. | 395/200.59 |
| 6,021,444 A | | 2/2000 | Fukasawa ................... | 709/300 |

FOREIGN PATENT DOCUMENTS

WO 94/11813 * 5/1994 ................. 709/204

OTHER PUBLICATIONS

"Group Communications in Distributed Multimedia Ssytems", Simon et al, 1994 IEEE.*

"Group Communications in the AMOEBA Distributed Operating System", Kaashoek et al., 1991 IEEE.*

"The V Distributed System", Cheriton, 1988 ACM.*

"Interaction between the V Protocol and the Q.2931 Protocol for the Interactive Video Network", McPheters et al., 1995 IEEE.*

(List continued on next page.)

Primary Examiner—Hugh Jones
Assistant Examiner—W D Thomson
(74) Attorney, Agent, or Firm—Fitzpatrick, Cella, Harper & Scinto

(57) ABSTRACT

A processing system employs a plurality of processing apparatuses in which a shared operation can be executed. To this end, first a type of the shared operation is designated, and then a target user of one of the processing apparatuses for a shared operation in executing the designated shared operation is designated, the target user being either a target user individual or a target user group. Finally, execution of an inquiry process is controlled in accordance with a combination of the designated type of shared operation and the designated target user.

18 Claims, 11 Drawing Sheets

OTHER PUBLICATIONS

"Programming a Distributed System Using Shared Objects", Tanenbaum et al., 1993 IEEE.*

"Programming Multcomputers Using Shared Objects", Tanenbaum et al., 1993 IEEE.*

"Parallel Programming Using Shared Objects and Broadcasting", Tanenbaum et al. 1992 IEEE.*

"Using Group Communication to Implement a Fault Tolerant Directory Service", Kaashoek et al. 1993 IEEE.*

Kazuo Watabe, Shiro Sakata, Kazutoshi Maeno, Hideyuki Fukuoka, Kazuyuki Maebara, "A Distributed Multiparty Conferencing System and Its Architecture" Computers and Communications, Int'l Pheenix Conference, pp. 386–393, 1990.*

Hussein M. Abdel–Wahab, Sheng–Uei Guan, Jay Nievergelt, "Shared Workspaces for Group Collaberation: An Experiment Using Internet and UNIX Interprocess Communications" IEEE Communications Magazine, Nov. 1988.*

* cited by examiner

PROCESSING SYSTEM AND APPARATUS FOR PERFORMING AN INQUIRY PROCESS IN ACCORDANCE WITH A TYPE OF SHARED OPERATION AND A TARGET USER

BACKGROUND OF THE INVENTION

1. Field of the Invention

The present invention relates to a processing system and terminals therefor. More particularly, the invention relates to an inquiry confirmation mechanism between processing equipment in the processing system that performs shared operations between a plurality of processing equipment.

2. Related Background Art

In recent years, it has become possible to exchange data or share data by combining a plurality of processing equipment, such as personal computers or work stations. As a result, a groupware system has been proposed to support and utilize the shared operations to be carried out by a large number of people.

Since the nature of this groupware system is to execute shared operations, the operation conducted by one user is reflected on each user environment of many other users. For example, if one user actuates an application for use of presentation in a communication conference currently held on the groupware system, such data on the presentation are displayed under each user environment of all the participating members of the conference.

Conceivably, the shared operations can be classified into various formalities that include the following:

a conversational small conference;

a conference held by plural participants (a participant should act as the chairman or the leader thereof);

a discussion on shared data; and a shared operation on data shared by the participants.

For example, a conversational conference and a formal conference differ in the inquiries needed with respect to the start and termination thereof. Whereas no strict inquiry is needed for conducting a conversational conference, a formal conference should not be commenced or terminated unless it is determined finally by the chairman thereof. Also, depending on agenda and proposers, the way of inquiries (here, the way to acquire consent) should differ even in the same type of conference.

Therefore, the process required to acquire consent and confirm it among users who intend to share an operation includes a great number of aspects.

SUMMARY OF THE INVENTION

The present invention is designed in consideration of the conventional examples described above. It is an object of the invention to provide a processing apparatus, a processing system, and a processing method to enhance the versatility of inquiry processes for shared operations, and a medium that stores a program for representing such processing method.

It is another object of the invention to provide a processing system and an apparatus therefor capable of issuing inquiries flexibly corresponding to various types of shared operations and making confirmation of such inquiries.

In order to achieve the objects described above, the present invention provides a processing system that comprises means for designating a target user or target group of users of processing apparatuses for a shared operation in executing such shared operation, means for designating an inquiry process corresponding to the user or the combination of the user and the group of users and execution means for carrying out the designated inquiry process.

It is still another object of the invention to provide a processing system and an apparatus therefor provided with new functions.

The advantages and features of the invention will be apparent with reference to the accompanying drawings and detailed description of the preferred embodiments, which will follow.

DETAILED DESCRIPTION OF THE PREFERRED EMBODIMENTS (First Embodiment)

Hereinafter, with reference to the accompanying drawings, the description will be made of a first embodiment representing one embodiment in accordance with the present invention.

Figure 1:
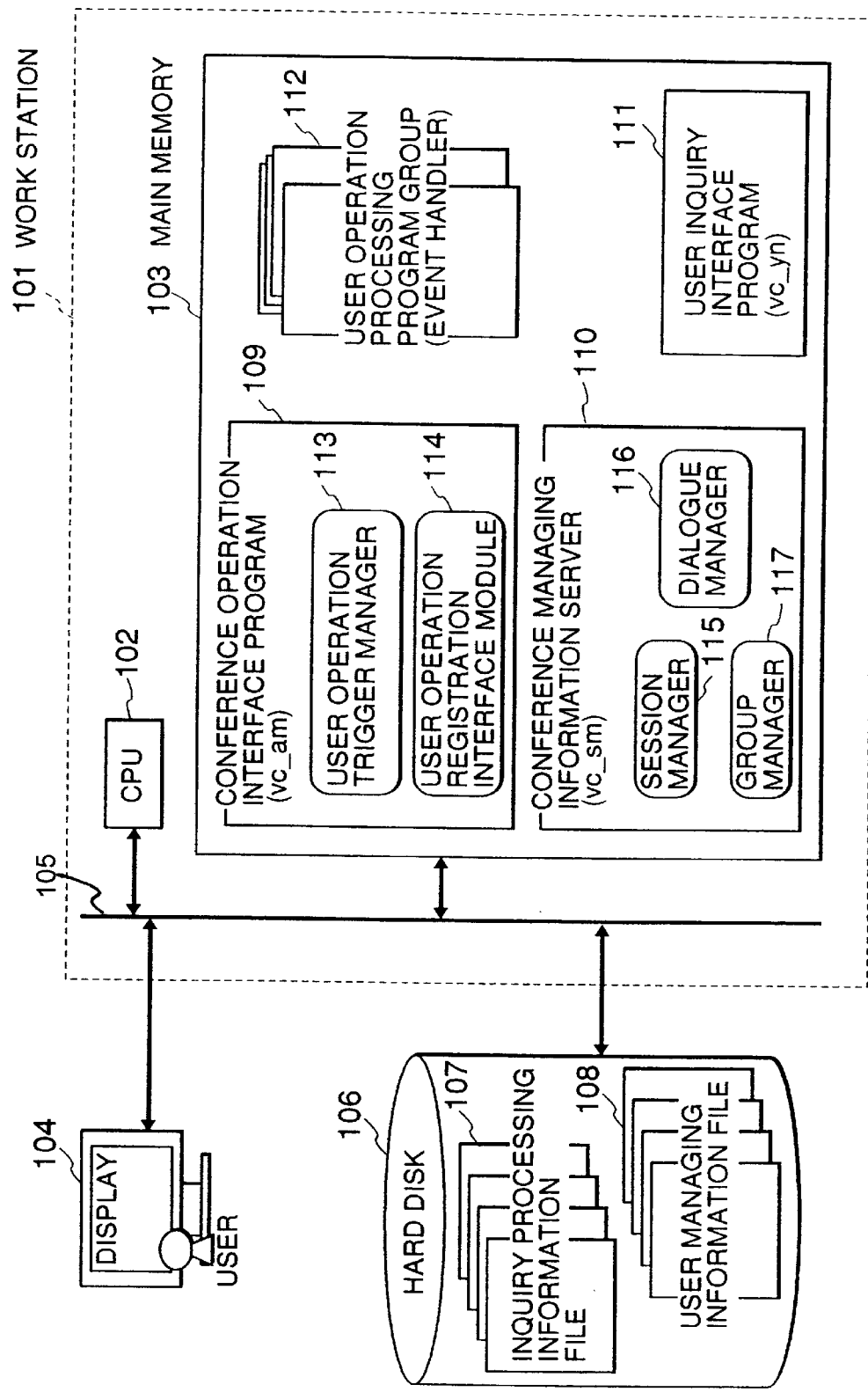
FIG. 1 is a structural diagram which shows a conference management system in accordance with a first embodiment of the present invention.

FIG. 1 is a structural diagram which shows a conference management system in accordance with the first embodiment of the present invention.

Of the shared operations, the first embodiment exemplifies the one to be managed in the formality of a communication conference.

In the present embodiment, the conference under the management of this system is hereinafter referred to as a "session".

In FIG. 1, a work station 101 comprises a CPU 102 to execute processes in accordance with the first embodiment; a main memory 103 to store fundamental software groups 109, 110, 111, and 112 for this conference management system; and computer bus 105 to connect the CPU 102 and the fundamental software groups. Also, a hard disk 106 that stores the permanent data required for executing processes in accordance with the present embodiment, and a display 104 for representing the user interface through which the user operates the system are connected to the work state 101. In this respect, various operations required for the inquiry process, confirmation process, and others, which will be described later, are executed by means of input through a pointing device, such as a keyboard or a mouse (not shown), operated by the user. (The keyboard, mouse, and other pointing devices are connected to the work station through the respective interfaces.)

Meanwhile, in the hard disk 106, there are stored inquiry processing information files 107 and user management information files 108.

The inquiry processing information files are those files on which information needed for controlling the inquiry process, which will be described later, are written in accordance with the present embodiment. The user management information files 108 are those files on which necessary information are written in accordance with the present embodiment to manage a target user and a group of target users with respect to an inquiry process, which will be described later.

The information contained in the inquiry processing files 107 and the user management information files 108 are under the management of a conference management information server 110.

Now, the description will be given below as to the fundamental software of the present system, such as the conference management information server 110. In this respect, the following four kinds of programs are provided for the fundamental software of the present system.

Conference Management Information Server 110

This is a server that performs the centralized management of the shared information on sessions, users, and others for the present system. In accordance with the example shown in FIG. 1, this server is incorporated in the work station 101 to operate together with other programs. However, it is sufficient if one conference management information server 110 is operative for one communication conference. (That is, it will suffice if only one server is operative among plural terminals when such conference is held.) As a result, when this system is used actually, it is generally practiced to prepare a work station dedicated to the use of the conference management information server 110, and to operate this server on such work station. (A work station dedicated to the use of the conference management information server 110 is called SM_HOST.)

The conference management information server 110 is assembled as a program called vc_sm. Hereinafter, therefore, the conference management information server 110 is referred to as vc_sm.

Session Manager 115

This is a module to manage the information regarding a conference (such as the name of conference, contents, participants, application to be used), which is assembled as a simple data base in accordance with a hash table.

Dialogue Manager 116

This is a module to manage the information regarding a user inquiry processing (such as the name of the target user inquiry process including session start, session terminate, and others, for instance, each name of target users of the inquiry process). This module is also assembled as a simple data base in accordance with a hash table.

Group Manager 117

This is a module to manage the information regarding a user and a group of users (such as the name of user, the current status of the user, the members of the group). This module is also assembled as a simple data base in accordance with a hash table.

The user and group under the management of this module are written specifically by the examples of contents of inquiry information files 310, which will be described later. In this respect, such user and group are registered in the user management files 108 in advance, but any temporary groups formed by the participants of other sessions (such as only male participants, only female participants, only those on the supervisory level) are also under the management of this module.

Conference Operation Interface Program 109

This program is assembled under a file name vc_am 109.

Per user environment of each of the users, one interface is actuated so as to provide the user with an interface for use of conference operation. In other words, the vc_am 109 interprets the user's operation to update the corresponding information on the vc_sm 110; to exchange data on the vc_am of other users; and to control the other programs 111, 112, and the like, which can be operated under the user's environment. The vc_am 109 is provided with the following two important modules.

User Operation Trigger Manager 113

This is a module to manage the corresponding relationship between the operation that a user executes through the user interface, and the corresponding process thereof. When a user operation takes place, this module receives it as an event, thus actuating the process corresponding to the user operation. In accordance with the present embodiment, the process that corresponds to the user operation is implemented as a program (an event handler to be described later) independent of the vc_am 109 and vc_sm 110. As a result, the user operation trigger manager 113 is assembled as a command correspondence table for actuating an event handler corresponding to the name of user operation.

User Operation Registration Interface Module 114

This is a module to provide an interface for setting the relationship between the target user operation by the user operation trigger manager 113, and the name that has been defined for such user operation. In accordance with the present embodiment, since the user interface is formed by the utilization of a window system X, the user operation registration interface module 114 is implemented as call back functions, which are called in response to an operation on the user's window, and a correspondence table of the names of user operations. In the vc_am 109 of the present embodiment, the following operations are registered by use of the user operation registration interface module 114:

Session-Start
Session-Terminate
Session-Join
Session-Disjoin
Session-Make-Join
Session-Make-Disjoin These operations correspond in order from the top to the commencement of a conference, the termination of a conference, the attendance to a conference in the middle of session, the retirement from a conference in the middle of session, additional participants in a conference, and deletion of participants in a conference.

User Inquiry Interface Program 111 (vc_yn)

This is a program to provide a user interface for the user operation inquiry process in accordance with the present embodiment. Upon request from the vc_am 109 and other programs, this program operates to show a panel such as shown in FIG. 2 on the screen of the display of a user at the destination of inquiry.

Figure 2:
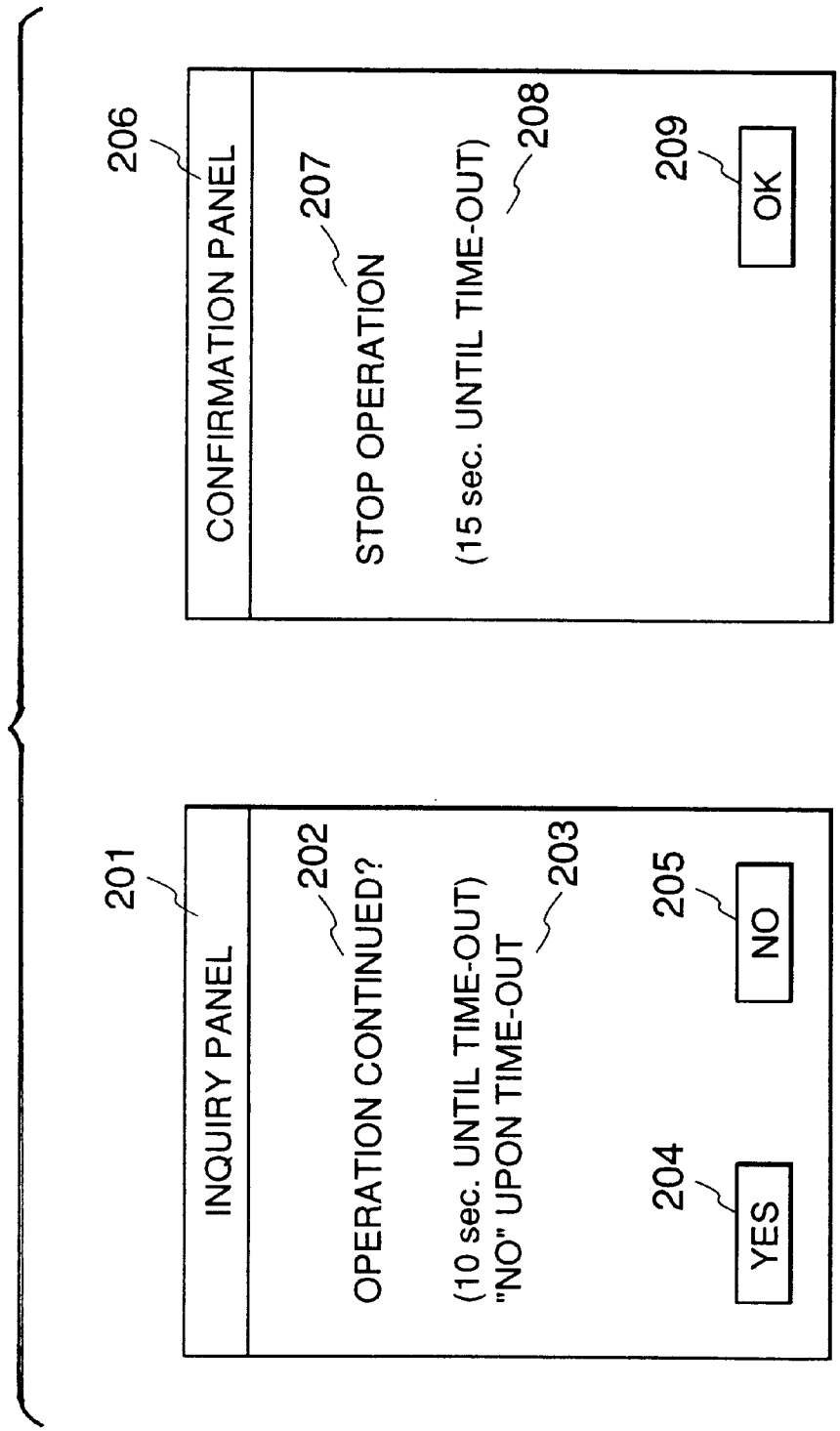
FIG. 2 is a view showing the user interface for processing inquiries in accordance with the first embodiment.

As shown in FIG. 2, a reference numeral 201 designates an inquiry panel whereby to request a YES or NO answer from a user. The inquiry panel 201 comprises four components. A reference numeral 202 designates a message field where the contents of inquiry to the user are indicated; and 203, a time out information field, that is, a field where an indication is automatically made as to the user being assumed to have answered either YES or NO several seconds after such indication appears on the display if the user does not decide on YES or NO until then. In FIG. 2, it is assumed that if no response is made within 10 seconds, the user has decided on NO. The remaining YES button 204 and the NO button 205 are the buttons whereby the user designates his response. Also, a panel 206 is to provide information for the user to obtain confirmation from him.

This confirmation panel comprises three components. A reference numeral 207 designates a message field where information is provided for a user; 208, a time out information field; and 209, an OK button that enables the user to designate his confirmation of the message represented in the message field. The time out information field 208 indicates to the effect that the confirmation panel is automatically closed after 15 seconds.

In either panels 201 and 206, the response from the user is notified to the program that has issued the request of the panel display.

User Operation Processing Program Group 112

As referred to in the description of the vc_am 109, the user operation process is executed by the user operation processing program group 112 in accordance with the set up of the vc_am 109 and the vc_sm 110. These program groups are also called event handlers (process functions and process procedures), and exist on the basis of one group to one kind of user operation.

Figure 5:
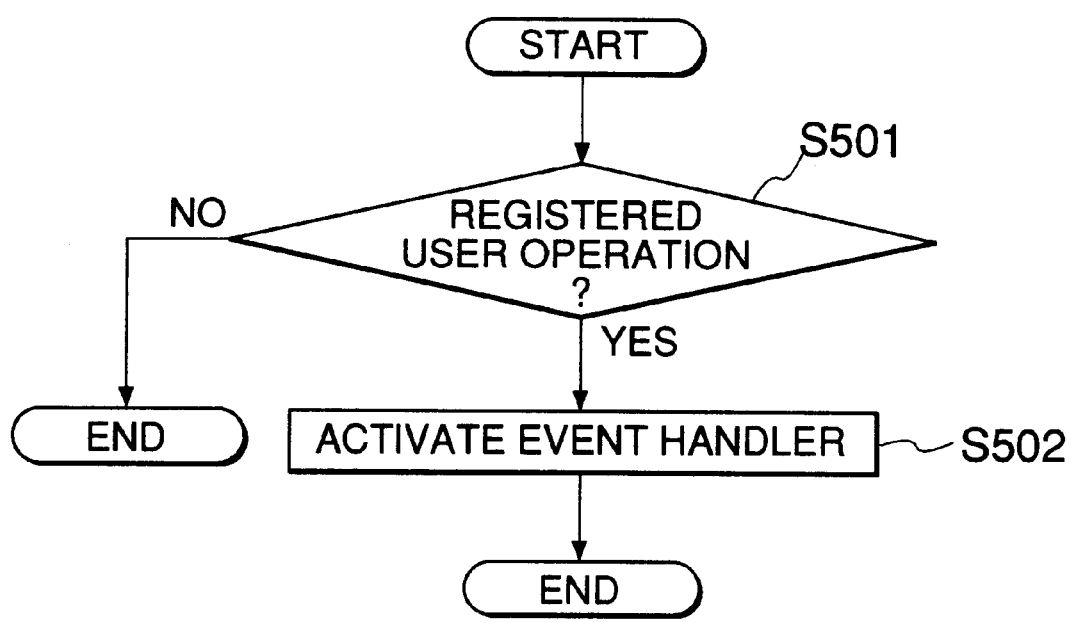
FIG. 5 is a flowchart which shows the operation of the interface program of a conference operation in accordance with the process represented in FIG. 3.
Figure 6:
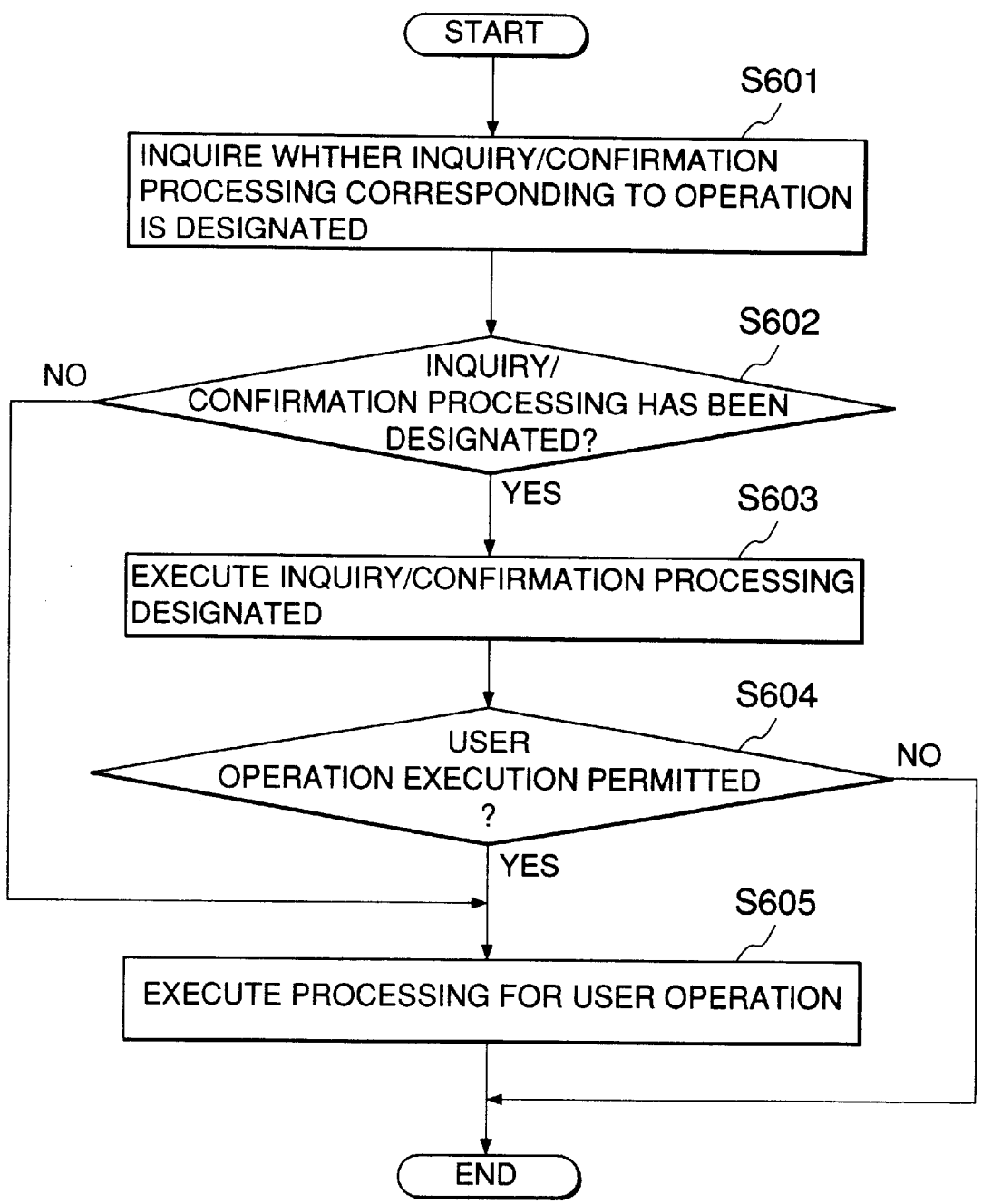
FIG. 6 is a flowchart which shows the operation of an event handler in accordance with the process represented in FIG. 3.
Figure 7:
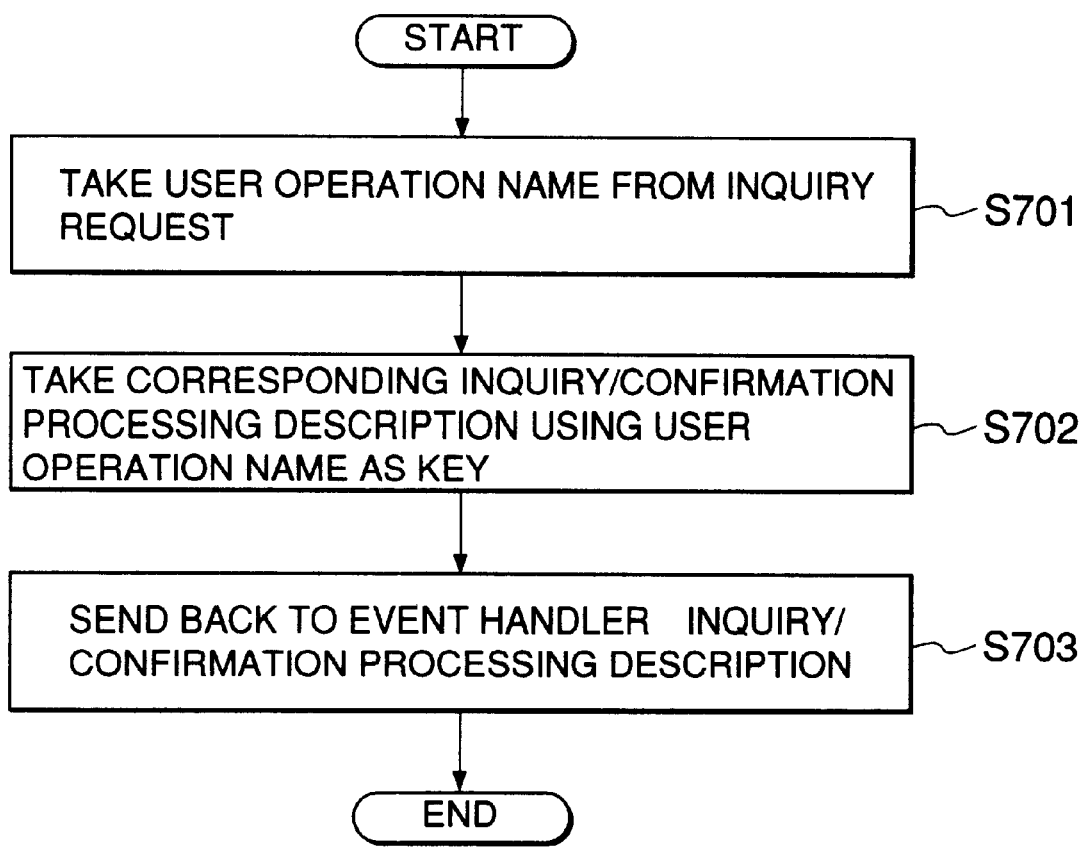
FIG. 7 is a flowchart which shows the operation of a dialogue manager in accordance with the process represented in FIG. 3.

Now, in conjunction with FIG. 3, and FIGS. 5, 6, and 7, the description will be made of the fundamental user operation inquiry. Here, in FIG. 3, the same reference marks are applied to the same locations where the same processes are executed as in FIG. 1. FIGS. 5, 6, and 7 are flowcharts showing the operations of the conference operation interface program 302, event handlers 305, and dialogue manager 307, respectively.

Figure 3:
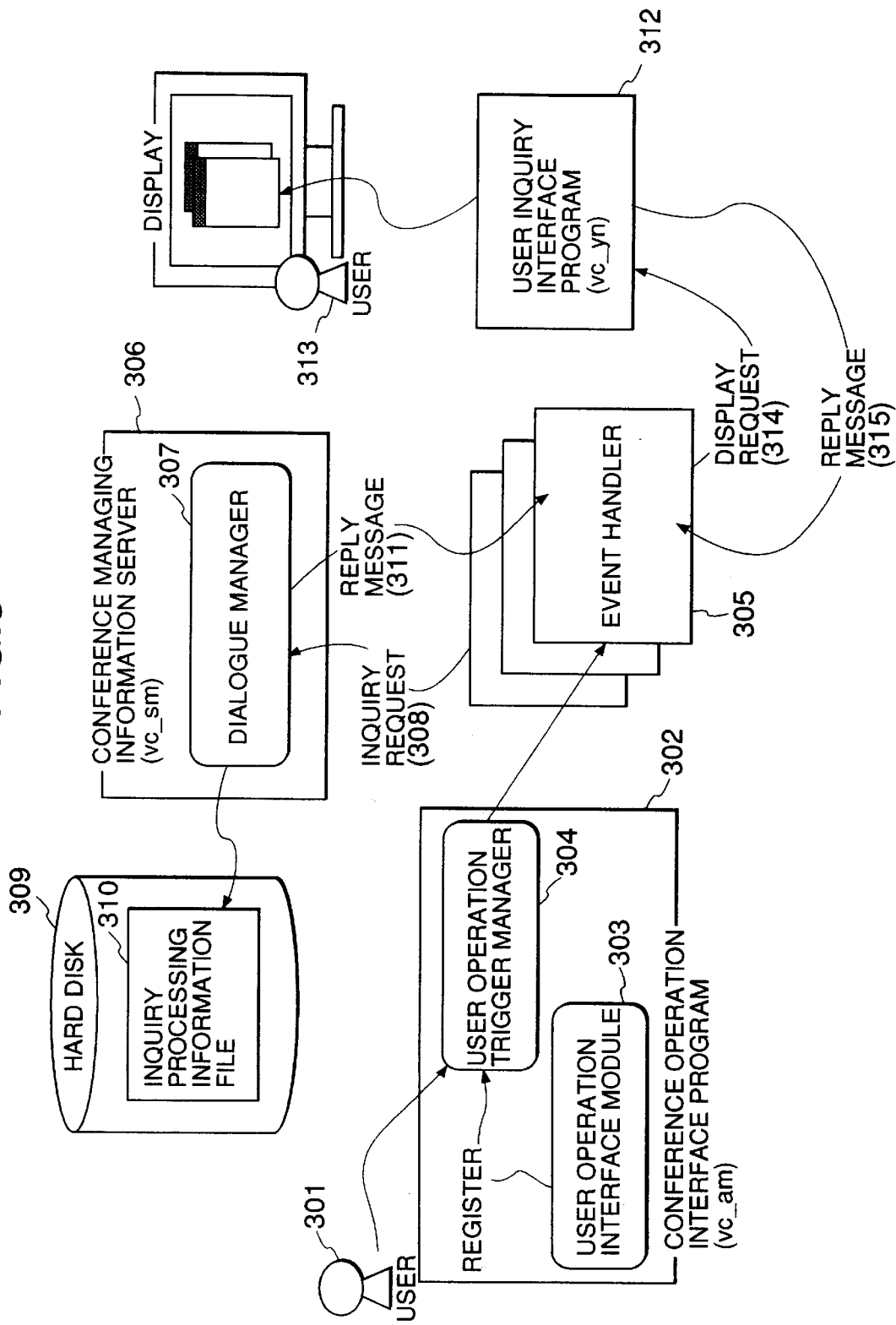
FIG. 3 is a view which illustrates the process flow of a fundamental user-operated inquiry in accordance with first embodiment.

In FIG. 3, it is assumed that the user 302 has operated appropriately.

If this user's operation is the one registered in the user operation registration interface module in advance (such as the commencement of a conference, the termination of a conference as described earlier) (step S501 in FIG. 5), the user operation trigger manager 304 actuates an event handler 305 that corresponds to such operation (step S502). The event handler 305 thus actuated makes an inquiry at the dialogue manager 307 in the vc_sm 306 as to whether or not any inquiry and confirmation processes are designated with respect to the user operation at 308 before any process (such as the commencement of a conference, the termination of a conference) begins for the user operation (step S601). To this request on inquiry 308, or more specifically, to a command that identifies such request, a user operation name is added corresponding to this particular user operation by means of the user operation registration interface module 303.

The dialogue manager 307 fetches the user operation name from the request on inquire 308 (step S701), and makes an access to the hard disk 309 with this name as a key. By means of this access based on such key, it is examined whether or not any inquiry and confirmation processes are designated corresponding to such key in accordance with the inquiry processing information files 310. Thus, the portion regarding the user operation that corresponds to the key is fetched from the inquiry processing information files 310 (step S702). After that, that portion is transmitted as the reply message 311 regarding the request on inquiry 308.

The event handler 305 examines the reply message 311. If there is no designation of inquiry and confirmation process (step S602), the user operation processing is executed immediately, because no process is needed for the inquiry and its confirmation (step S605).

On the other hand, if an inquiry and confirmation process is designated (step S602), a request 314 on the display of inquiry and confirmation panels, and others is issued to the user inquiry interface program 312 in accordance with the inquiry and confirmation thus designated. Then, the response from the target user 313 of inquiry and confirmation is awaited (step S603). The response from the target user of inquiry and confirmation is returned to the event handler 305 as reply 315 of the request 314. As a result of the response 315 from the user 313, the user operation process is immediately executed (step S605) if the user operation is executable for the aforesaid user operation process (step S604). On the contrary, if no user operation is possible due to user's rejection of its execution or the like (step S604), the event handler 305 is terminated without executing any user operation process.

Now, the description will be made of information written on the inquiry processing information files 310.

The following is an example of the contents of the inquiry processing information files 310:

| Type Name of Operation | Req-User | SS-Other-User | Target-User |
|---|---|---|---|
| Session-Start | N[Req-User(5)] | Y(5): all[SS-Other-User(5)] | x |
| Session-Terminate | N | Y(5): all | x |
| Session-Join | N | Y(3): majority | y |
| Session-Disjoin | N | Y(3): majority | y |
| Session-Make-Join | y (5) | X | x |
| Session-Make-Disjoin | y (5) | X | x |
| Tool-Start | N | X | x |
| Tool-Terminate | N | X | x |

On the line defined as Type on the head thereof, the target user and the group of target users with respect to the inquiry process are listed.

Here, Req-User, Target-User, SS-Other-User are designated. These represent users given below.

Req-User—the user who has requested an operation

Target-User—the user who is the target of an operation

SS-Other-User—users other than the Req-User and Target-User in a session

These are the groups defined by the session manager in the vc_sm in advance, but it may be possible to arrange those groups defined by the group manager 308 later as the target of inquiry.

Also, the descriptions written following each name of groups indicate the inquiry and confirmation process to be executed for such group, respectively. The inquiry processing information files 310 are managed as text files. The files can be rewritten by user by use of a keyboard or a mouse (not shown). Therefore, if the environment of an inquiry should be modified, it is easy to make such modification by rewriting this description accordingly.

This description corresponds to either one of the following three sentence structures:

1. [Designation of inquiry process]
   ([time out of inquiry]):[Request YES count]
2. [Designation of confirmation process]
   ([time out of confirmation])
3. [Designation of inquiry process]
   ([Time out of inquiry]):[Request YES count]
   [[Designation of confirmation process]([Time out of confirmation])]

Designation of Inquiry Process

It is possible to designate the inquiry processes given below.

X—no inquiry process is executed.

N—inquiry panel is displayed. No process is executed at the time out.

Y—inquiry panel is displayed. YES process is executed at the time out.

The period of time for the time out is a [inquiry time out] seconds.

If the designation of any time out is omitted, it is assumed and handled that the time out period is indefinite.

Designation of Confirmation Process x—no confirmation process is executed.

y—confirmation panel is displayed.

The time out period is [confirmation process time out] seconds.

For the confirmation process, too, if the time out is omitted, it is assumed and handled that the time out period is indefinite.

Also, for the designation of the confirmation process in the sentence structure 3, the designation should be made by means of the name of user or group, which is the target of the confirmation process to be executed.

This procedure corresponds to the mode in which the result of inquiry process is notified anew to the user.

Request YES Count

This counting is meaningful mainly with respect to an inquiry as to a group formed by a plurality of users. This counting is set to interpret that the responses from the group are YES as a whole if a minimum number of YES responses is obtained within such group, and the following numeric value or a character string is designated:

a. an integer more than zero
b. all (all the members in a group)
c. majority (a half of all the members in a group+1); and
d. combinations of a and b by the operators of addition, subtraction, multiplication, and division The designation is possible only for the inquiry process, but it is omitted if not needed.

More specifically, the operator defines the contents of the sentence structure for making an inquiry and confirmation at the time of session-start. For the user who has requested the session-start, an inquiry panel is displayed. During a period of five seconds, the result of inquiry is displayed on the panel (Sentence structure 3). Also, for each of the SS-Other-Users, an inquiry panel is displayed to notify him of the time out in five second (Description of Y(5). Only when all the SS-Other-Users agree, the session begins (Description of :all). Then, each of the SS-Other-Users is informed of the result of his inquiry by means of a 5-second display on his panel (Sentence structure 3).

Also, the y(5) of Req-User in the Session-Make-join indicates that a confirmation panel is displayed for a period of five seconds when he desires a Make-join to a session (Sentence structure 2).

Figure 4:
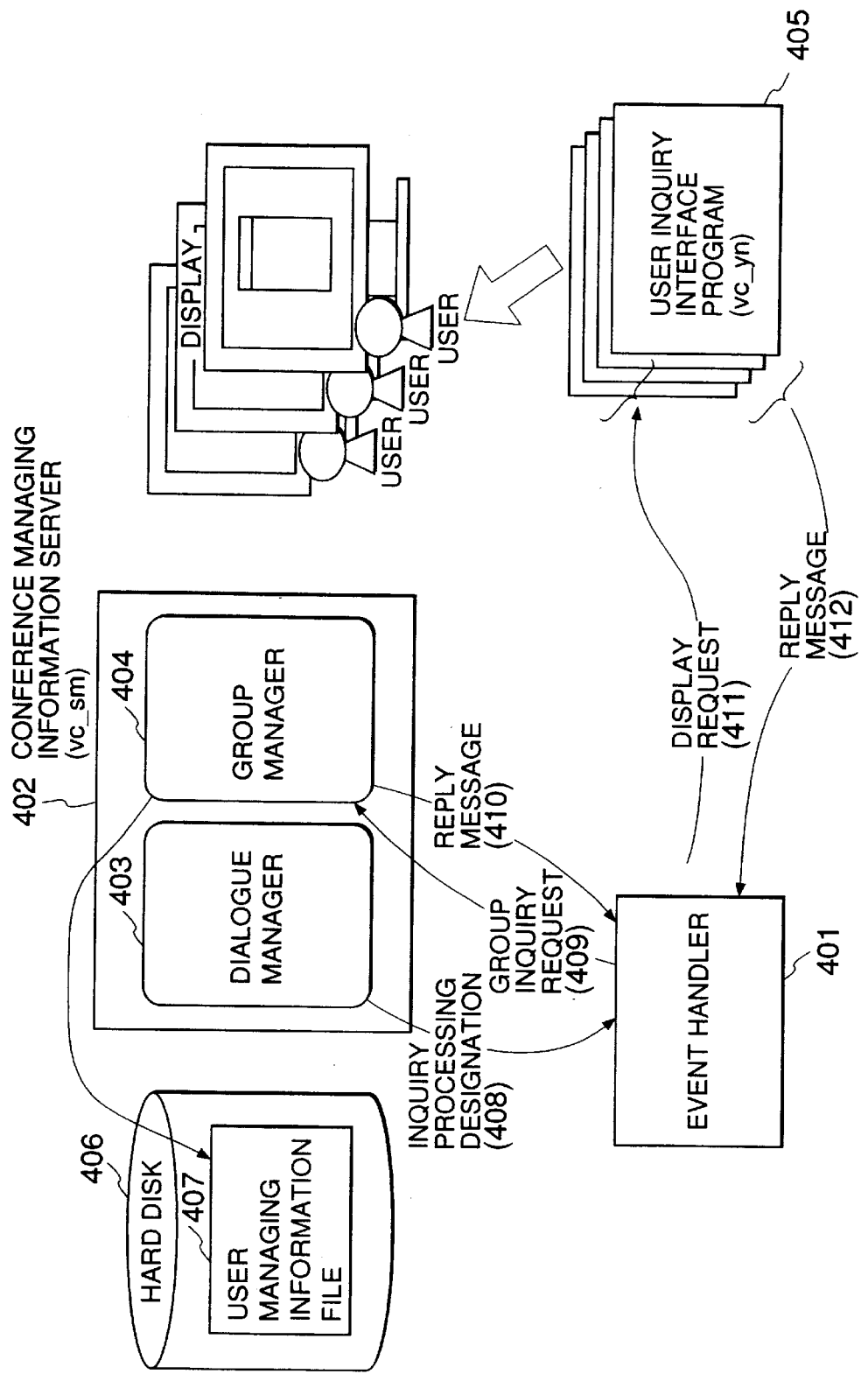
FIG. 4 is a view which illustrates the flow of interpretation and execution of the description of an inquiry by means of an event handler.

FIG. 4 is a view which shows a state immediately before the event handler 305 receives a reply message 311 corresponding to an inquiry process in accordance with the processing described in conjunction with FIG. 3.

Figure 8:
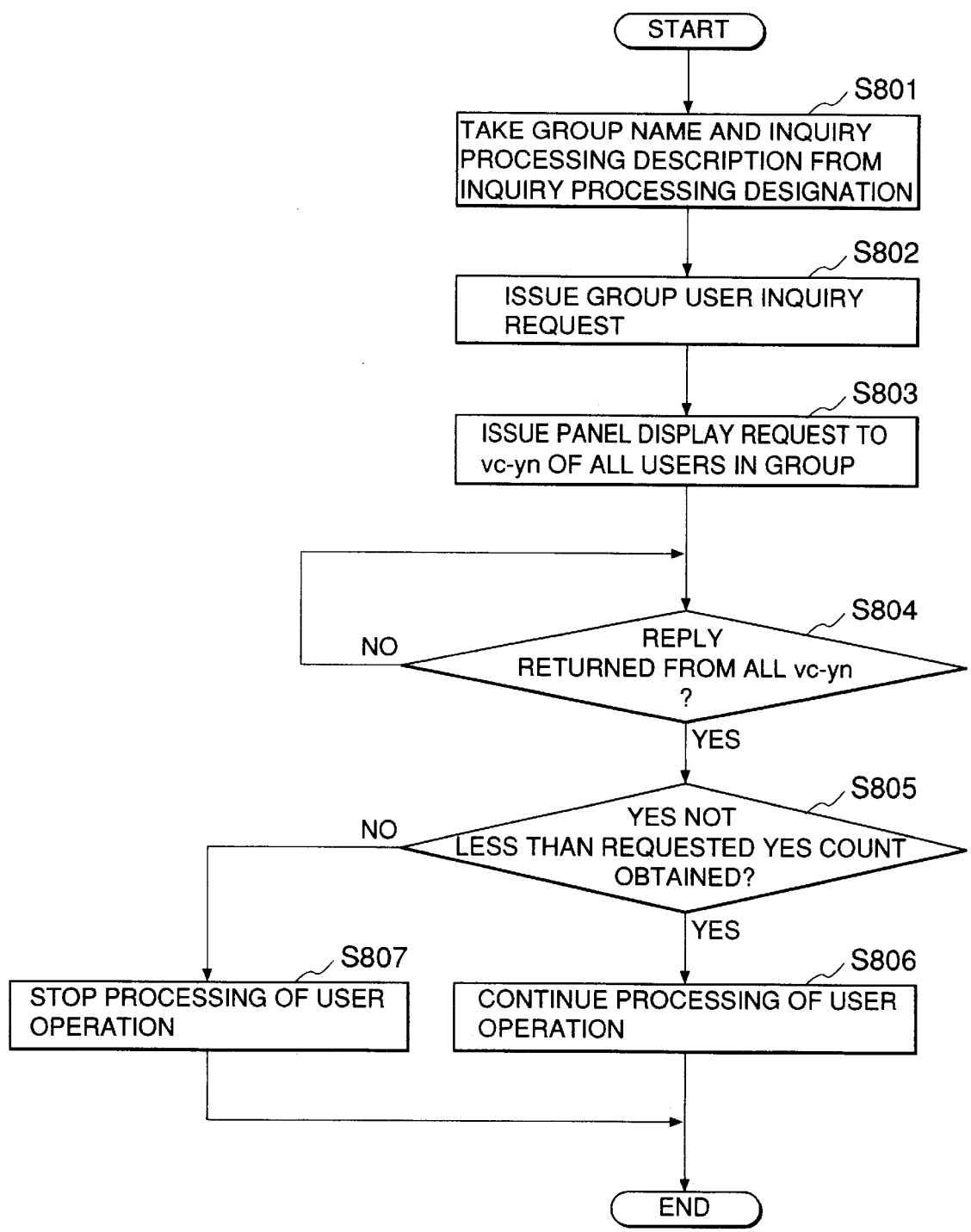
FIG. 8 is a flowchart which shows the operation of an event handler in accordance with the process represented in FIG. 4.

Also, FIG. 8 is a flowchart that shows the processes executed by the event handler 401 represented in FIG. 4.

In FIG. 4, it is assumed that the event handler 401 receives the designation of an inquiry process 408 from the dialogue manager 403 in the vc_sm 402.

For this designation of the inquiry and confirmation process 408, the initial one line (being called a definition line) of the inquiry processing information file described above, and lines describing the inquiry processes (being called description lines) corresponding to the target user operation are transferred as they are as character strings.

When receiving the designation of the inquiry process 408, the event handler 401 applies the processes given below repeatedly from the definition line and the head of the description lines.

In other words, the group name and the description of the inquiry process are fetched from the designation of the inquiry process 408 (step S801), and at first, the group user inquiry request to which the group name is added is issued to the group manager 404 (step S802). Then, the group manager 404 fetches the list of all users belonging to the designated group from the user management information file 407 stored on the hard disk 406, and adds the list to the reply message 410, thus returning it to the event handler 401.

When receiving the user's list, the event handler 401 issues a panel display request 411, which corresponds to the description of the inquiry process, to each vc_yn 405 currently in operation under the user environment by all the users on the list (step S803).

In this case, it is usually assumed that there are a plurality of target users with respect to the inquiry process as shown in FIG. 4.

Now, even if the user is only one, the processes given below are executed in the same manner as to deal with a plurality of users.

In other words, the event handler 401 waits for all the reply messages 412 returning from each vc_yn 405 on all the sources of request (step S804). As a result, if the number of users responding YES is more than the value of the [request YES count] described in the inquiry process (step S805), it is assumed that the YES has been obtained as a whole, thus continuing the user operation processing (step S806).

If such number is less than the value of [request YES count], it is assumed that the responses are NO as a whole, thus suspending the user operation processing (step S807).

For the confirmation process, the event handler is equally on the standby until the confirmation process is completed for each vc_yn on all the sources of request.

The operations described above are applied in order described in the files with respect to the entire groups designated by the definition line.

In such a manner as described above, the present embodiment comprises:

means for designating the target processes of inquiry and confirmation in a session that represents a conference abstractly;

means for designating the target user groups of the inquiry and confirmation in the session; and means for designating the types of inquiry and confirmation processes corresponding to the combination of operations and users as inquiry processing information files, and further, as means for executing the inquiry and confirmation processes, the present embodiment provides software groups, such as vc_am, vc_yn.

In accordance with the present embodiment, it is possible to perform an inquiry process with respect to a conference: particularly, it is possible to perform such process flexibly for a plurality of users in this respect.

Also, in accordance with the present embodiment, the description of inquiry processes is managed as user management information files in the regular format of text files. As a result, there is no need for the provision of any particular mechanism for corrections or modifications thereof.

Further, by designating an inquiry to a plurality of groups with respect to one operation, it is possible to make such inquiry stepwise.

(Second Embodiment)

In the first embodiment, the description is made to a case where the present invention is implemented as a communication conference management system for information processing apparatuses such as computers. As a second embodiment, the description will be made of a case where the present invention is implemented as an Awareness system capable of controlling cameras arranged in a plurality of locations.

This Awareness system is a system that makes it possible to grasp the current situations of remote locations at the user's seat by enabling the video taken by a plurality of cameras arranged in appropriate locations to be displayed on the screen arbitrarily. Although different from the shared operation such as a conference in its strict sense, this system is still applicable as a system of shared operation in a board sense in which it can provide means for exchanging information between users as a pre-stage of a shared operation. Therefore, this system is preferably applicable to recognizing the current situation of a party (or parties) before beginning a shared operation with such party or parties.

At first, in conjunction with FIG. 9, the description will be made of the principal structural elements of this Awareness system.

Figure 9:
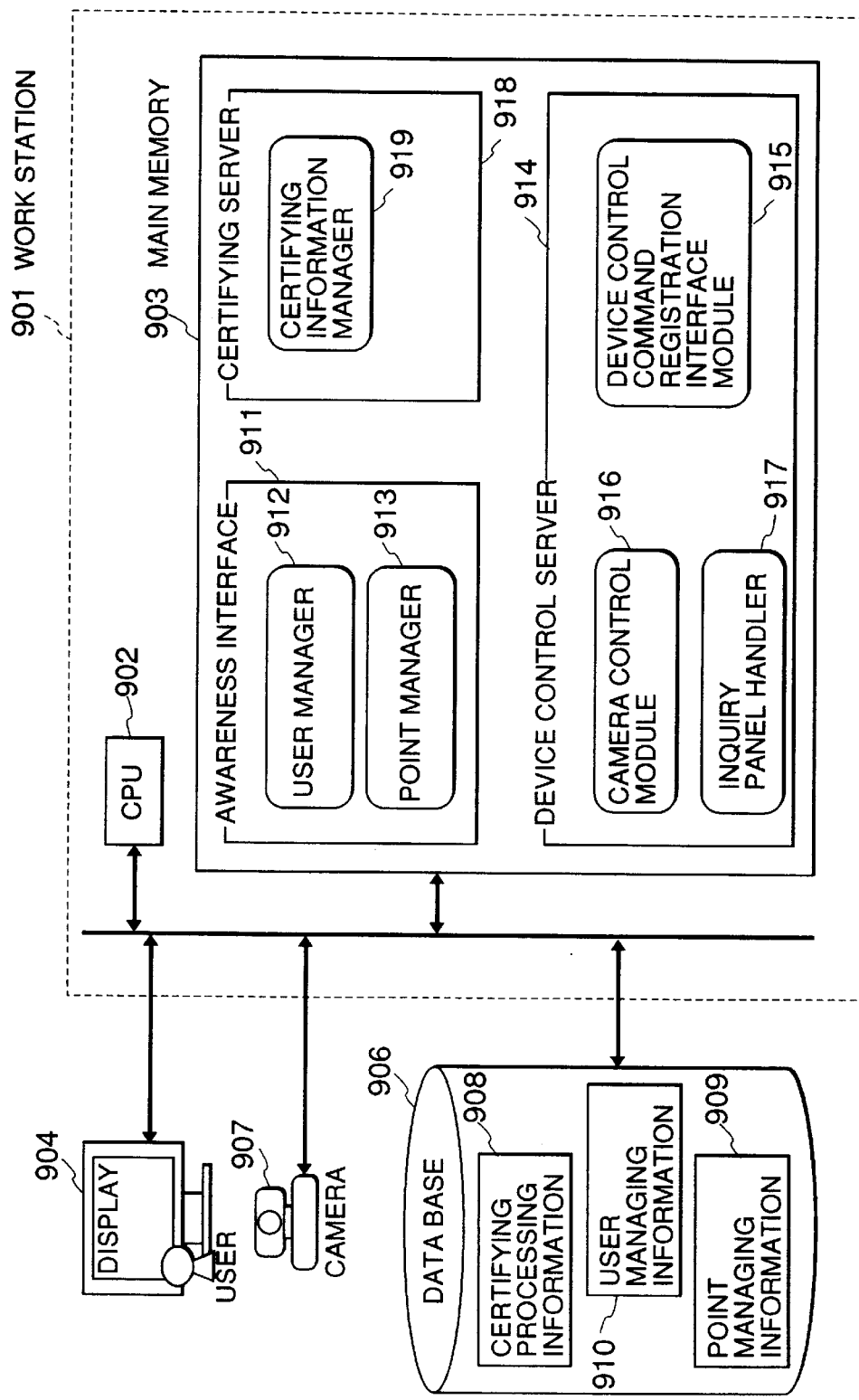
FIG. 9 is a view which shows the structure of an Awareness system (grasping the situation) in accordance with a second embodiment of the present invention.

In FIG. 9, a work station 901 is structured by connecting a CPU 902 executing processes in accordance with the present embodiment with a main memory storing the fundamental software groups 911, 914, and 918 of this Awareness system by means of a computer bus 905. Also, to the work station 901, there are connected a data base 906 (hard disk or the like) to hold permanent data needed for executing the processes of the present embodiment; a camera 907 capable of being controlled by the computer, which serves as means for grasping situations; and a display 904 to indicate a user interface for the user to operate the system. For the data base 906, certifying process information 908, point management information 909, and user management information 910 are provided as described later in conjunction with the column of certifying information manager. Also, to the work station 901, a keyboard, mouse, and other pointing device operated by a user are connected as in the first embodiment, thus data input and designations being made possible through its interface.

For the data base 906 itself, it is possible to utilize the usual relational data base, object oriented data base, or any others that may be provided with a mechanism to make data permanent and perform consistent management. Here, the certifying process information 908 contains information needed for controlling the certifying process that will be described for the present embodiment.

This certifying process is an observation of a video at a certain place or a procedure to be taken to determine whether or not an execution should be carried out when the control of a camera or others is requested. Also, the point management information 909 contains information needed for the management of a target camera 907 and other devices for the certifying process to be described in accordance with the present embodiment.

To this information, there are added kind of camera as to whether or not such camera is provided with the universal head, for example, and information of its readiness of remote control, such as whether or not the camera is provided with various functions including panning, tilting, zooming, white balancing, and the like, as well as information of the place where the camera is arranged. The user management information 910 contains information needed for managing the target user and target groups of users for the certifying process to be described in accordance with the present embodiment.

Now, the fundamental software groups of this system will be described.

Awareness Interface 911

An Awareness interface 911 is a program to provide a user interface to control the display of video taken by a camera and to control the camera (such as vertical and horizontal movement for video formation, zooming, white balancing, and the like). The Awareness interface is actuated by means of an actuation instruction by the user through the keyboard, mouse, or the like, thus making it possible to grasp situations.

For this Awareness interface 911, two important inner modules are provided.

User Manager 912

This is a module to manage information regarding a user and group of users (such as the name of user, the current status of the user, and members of the group) by the utilization of the data base 906.

Point Manager 913

This is a module to manage the device management information of the camera and others that can be utilized through the Awareness interface 911, which serves as the point management information 909, by the utilization of data base 906. In accordance with the present embodiment, the data base 906 is utilized. As a result, there is no need for the provision of any data server dedicated to the centralized control such as the vc_sm provided for the first embodiment.

Device Control Server 914

Whereas the Awareness interface is arbitrarily actuated by the user, the device control server 914 is always in operation by each of the machines to which a camera and other usable devices are connected. Since the work station shown in FIG. 9 is the one to which a camera is connected, the device control server 914 operates on the work station 901. The functions of the device control server 914 are to actually interpret the operation that a user performs through the Awareness interface, and to executes it.

The device control server 914 is provided with two important modules given below.

Device Control Command Registration Interface Module 915

As the user operation trigger manager 113 for the first embodiment, this is a module to provide a programmer interface for setting the relationship between the target camera operation process and the name defined for such target camera operation. In accordance with the present embodiment, the device control command groups are registered by means of this module on a list of target certifying process commands in a camera control module 916.

Camera Control Module 916

This is a module to interpret the request on camera operation from the Awareness interface and the like, and to execute it. In accordance with the present embodiment, a camera is the main target of the device control. Therefore, the description has been made of the camera control module, but if some other device control is performed, a control module for use of such device is incorporated in the device control server 914. This incorporation of a module for use of device control is usually executed when the device control server 914 is produced. However, if an operating system that supports a dynamic linkage can be utilized, it is possible to add such module arbitrarily to the device control server 914 during its operation.

Also, an inquiry panel handler 917 is a module to display an inquiry panel as in the first embodiment represented in FIG. 2.

Certifying Server 918

In accordance with the present embodiment, this server is to determine whether or not it is possible for the device control server 914 to process the device control commands inputted by the user by means of a keyboard or mouse through the Awareness interface 911. The certifying server 918 incorporates in it a module given below.

Certifying Information Manager 919

This is a module to manage by the utilization of the data base 906 the certifying process information 908 needed for utilizing a camera and other usable devices through the Awareness interface 911. The certifying server 918 determines whether or not the camera and devices can be operated in accordance with the certifying process information 908 under the management of the certifying information manager 919. Here, the description will be made of the contents of the certifying process information 908 at first.

The following items are contained in the certifying process information 908:

Command: [command names]
  Free-Users: [the list of users that can be utilized unconditionally]
  Possible-Users: [the list of users that can be utilized if admitted by means of inquiries]

These items are defined for all the commands of the target certifying process. In this respect, the commands are for designation, deletion, and the like for panning, tilting, zooming, white balancing area, and others. This area designation means that depending on cameras, only the central part of a video region is transmitted, for example, instead of making all the video area of a camera visibly recognizable. By means of the area designation, it is made impossible to transmit any background picture that should refrain from being observed.

Here, the user list means a list having user names arranged in a line, each of them being marked off by ','. The users registered on the [list of users usable unconditionally] are allowed to unconditionally perform the operations designated by the [command names]. Also, no users are allowed to perform any designated operations unless registered on the [list of users usable unconditionally] or the [list of users usable only when admitted by inquiries].

On the other hand, for the users belonging to the [list of users usable only when admitted by inquiries], there is a need for the designation of inquiry process as in the case of the first embodiment. In other words, for each of the users on the [list of users usable only when admitted by inquiries], the following is designated so as to obtain the admission of the [list of target users of inquiries]:

[user name]:[list of target users of inquiries]
  :[request YES count]

Actually, for the request on the Possible-User operation, the device control server that operates under the user's environment at the destination of inquiry displays the panel for use of inquiries. Here, to the user names in the [list of target users of inquires], '([time out period])' is added. In this way, as in the first embodiment, it is possible to designate the time out period for each of the users. Here, if no designation is made, the default value is 20 seconds.

Also, the [request YES count] can be designated as in the first embodiment, namely:

a. an integer more than zero
  b. all (all the members in a group)
  c. majority (a half of the members in the group +1); and
  d. combination of a and b by means of addition, substraction, multiplication, division The certifying process information defined as described above is exemplified as follows:

The line beginning with the mark '#' is ignored as comment.

header information
  Command: ZoomupCamera 1
  Free-Users: Fukasawa, Okazaki, Sato
  Possible-Users: Kawazome, Ono
  # restricted user description
  Kawazome: Sato(10), Bannai(20): all
  Ono: Bannai(20)

The command described above enables the users, Fukasawa, Okazaki, and Sato to zoom up the camera 1 unconditionally when the command ZoomupCamera 1 is inputted.

Also, when the users, Kawazome and Ono input the command described above, Kawazome is disabled to zoom up as Sato and Bannai are both allowed to operate in accordance with the command as a result of their inquiries, and the user, Ono is disabled to zoom up unless Bannai admits of the operation in accordance with the command described above.

Also, on the screen of Bannai's display, the inquiry panel appears 20 seconds, while on the screen of Sato's display, the inquiry panel appears 10 seconds.

In this respect, only a specific user (system management user) can rewrite the set up of the certifying process information.

Figure 10:
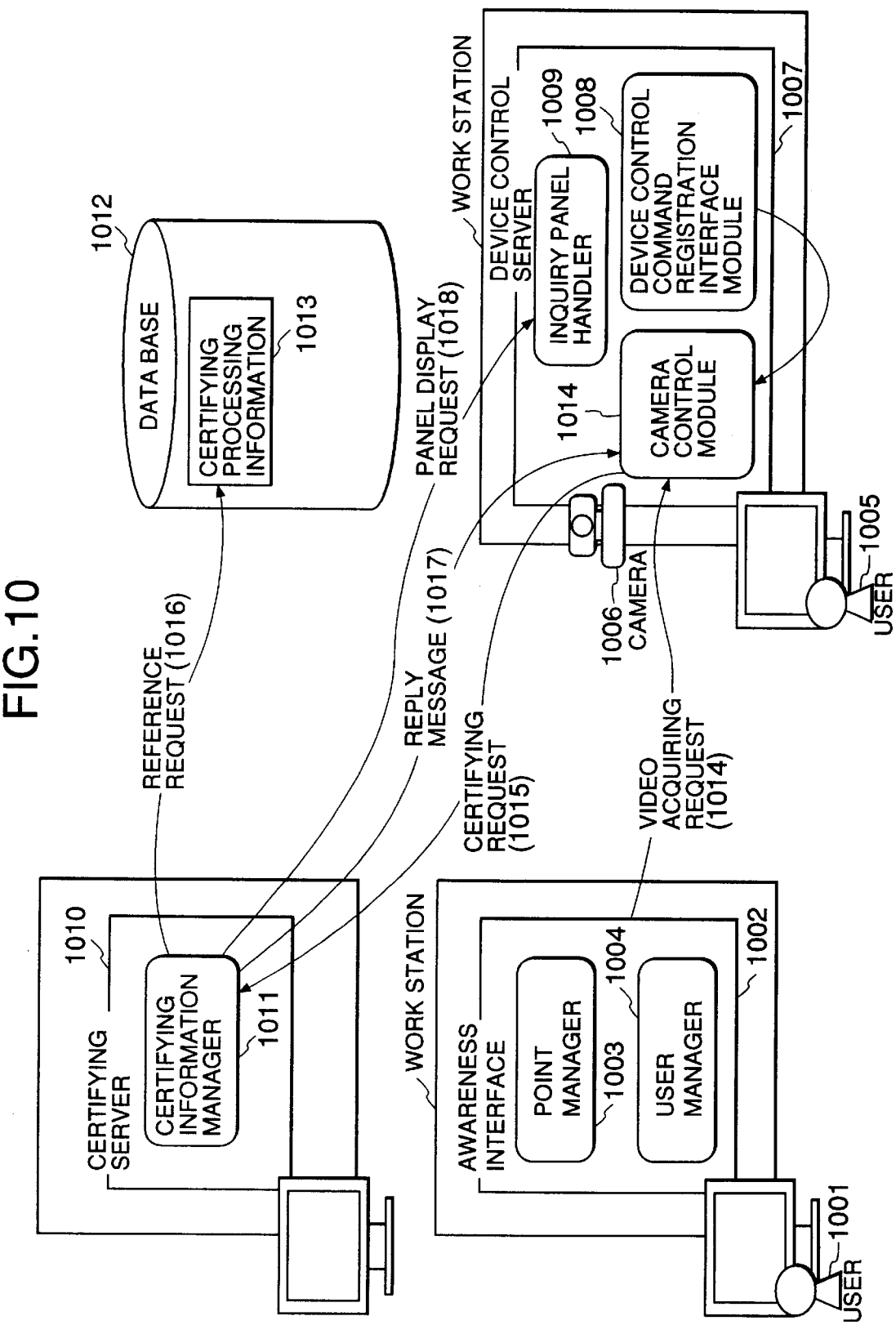
FIG. 10 is a view which illustrates the process flow of a fundamental user-operated inquiry in accordance with the second embodiment.
Figure 11:
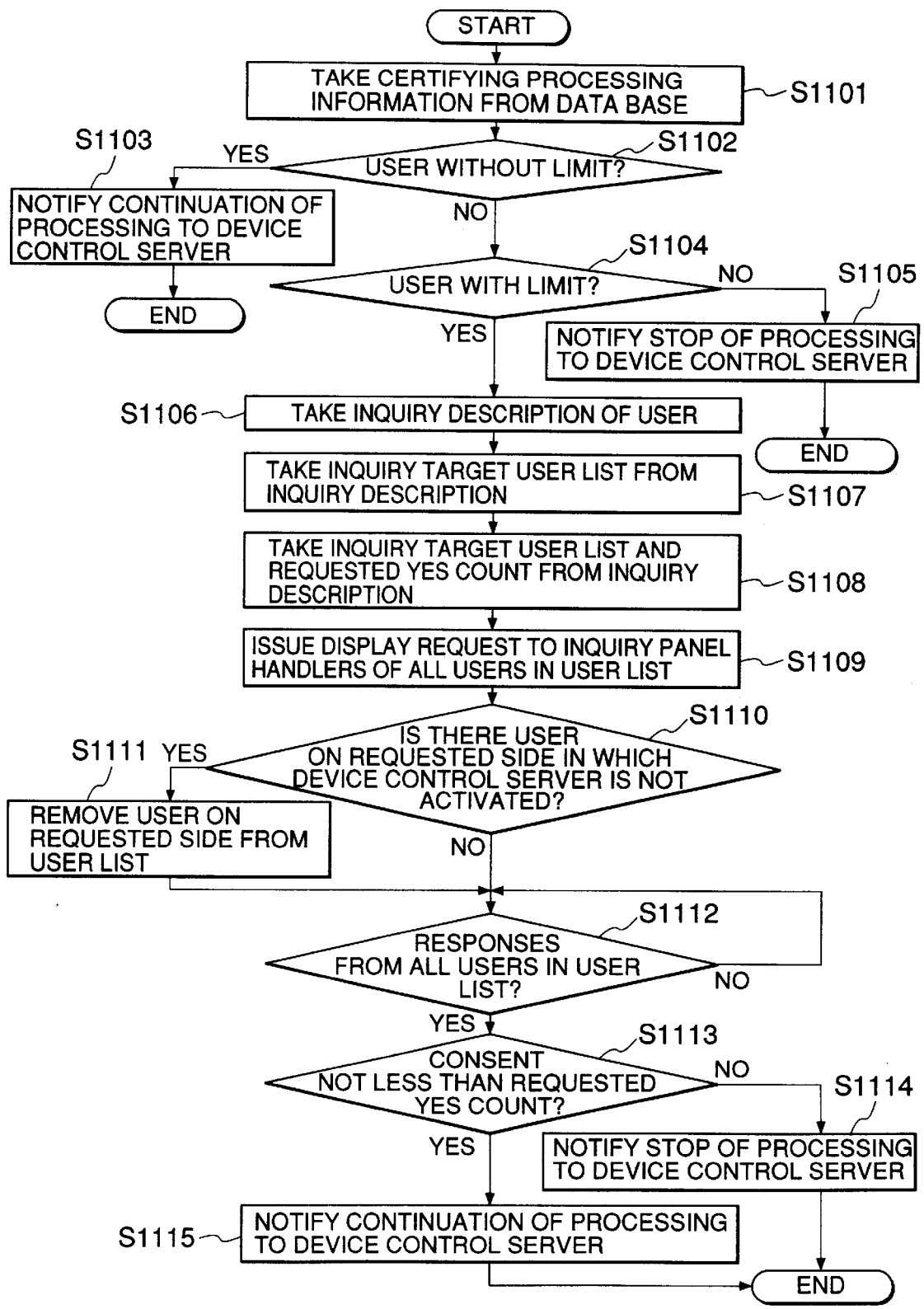
FIG. 11 is a flowchart which shows the operation of a confirmed information manager in accordance with the process represented in FIG. 10.

Now, in conjunction with FIG. 10 and FIG. 11, the description will be made of the process flow with respect to this system. FIG. 10 is a conceptual view showing the process flow. FIG. 11 is a flowchart showing the operation of the certifying information manager 1011.

In this respect, the same name is applied to the structure having the same function as described in FIG. 9. In FIG. 10, a user 1001 and a user 1005 are provided with the work station 901 shown in FIG. 9, respectively. Here, however, only the portions needed for description will be shown. In other words, only the Awareness interface is shown for the user 1001, while only the device control server is shown for the user 1005.

In FIG. 10, it is assumed that one user 1001 actuates the Awareness interface 1002 and issues an instruction through the keyboard, mouse, or other pointing device to request a reference to the video of a camera 1006 under the management of the device control server 1004 managed by the user 1005.

To this video acquisition request 1014, the user information managed by the user manager 1004 and the device (here, a camera) information managed by the point manager 1003 are added. These pieces of information are fetched from the data base 1012 automatically when the Awareness interface 1002 is actuated. If the video acquisition request 1014 is among those registered on the device control module by means of the device control command interface module 1008, the device control module 1009 issues a certifying request to the certifying server 1010 with respect to the operation related to such request.

To the certifying request 1015, the user information and device information additionally provided for the video acquisition request 1014 are added as they are.

Now, the certifying server 1010 receives the certifying request 1015, the certifying information manager 1011 processes it. In other words, the certifying information manager 1011 fetches the certifying process information 1013 from the data base 1012 (step S1101), and notifies the device control server 1007 of the continuation of process immediately by means of the reply message 1017 (step S1103) if the requesting user is a user who is free from any restrictions (step S1102). In this case, the device control server 1007 regards him as a user allowed to refer to the video as a result of the certified camera control, and admits of the reference to the video.

Also, if the requesting user is neither the one who is free from any restrictions nor the one who is subjected to restrictions (steps S1102 and S1104), the process is immediately suspended, and the device control server 1007 is notified accordingly. Then, on the screen of the display of the user 1001, the notice appears to inform the user 1001 to the effect that no reference to video is possible. This process is executed by means of the CPU that uses a result notification program (not shown) for the execution thereof. If the user is the one who is subjected to restrictions, the certifying information manager 1011 further searches the certifying process information 1013 contained in the data base 102 to set aside the inquiry description regarding the user 1001 (step S1106). Then, of such description, the [list of target users of inquiries] and the [request YES count] are fetched (steps S1107 and S1108), and all the users in the list are instructed to make the inquiry panel displays (step S1109).

The display of the inquiry panel is executed by the inquiry panel handler 1009 in the device control server that operates under the user environment of the target user. Here, if the device control server is not actuated under the target user's environment (step S1110), the process is executed by removing such user from the list temporarily (step S1111).

In FIG. 10, the panel display request 1018 is issued to the inquiry panel handler 1009 of the device control server 1007, and the inquiry is made with respect to the user 1005. The certifying information manager 1011 waits for responses from the users who have not been removed (step S112), and then, if consents equivalent to the [request YES count] are obtained (step S113), the device control server 1007 is immediately notified of the continuation of process (step S1115).

In this case, the device control server 1007 can execute the camera control process. In other words, it becomes possible for the user 1001 to execute the camera control process. On the contrary, if any consents amounting to the [request YES count] cannot be obtained (step S1113), the device control server 1007 is immediately notified of the process suspension (step S1114). In this case, too, the notification to the effect that no video reference is possible is indicated on the screen of the display of the user 1001 as in the case described earlier. Thus, the device control server 1007 cannot execute any camera control process.

As described above, the present embodiment provides:

means for designating certification in the Awareness system and the target operation of the inquiry process that accompanies it;

means for designating certification in the Awareness system and the target group of users for inquiry process; and the type of inquiry process with respect to the combination of operations and users in the form of inquiry process information description, and further the present embodiment provides software groups, such as certifying server, device control server as means for executing the certification and the inquiry processes.

In accordance with the present embodiment, it is possible to integrate the certifying process and the process regarding the access right to devices in the Awareness system, and to handle the processes thus integrated uniformly by the application of the present invention.

Also, it is possible to share the information and mechanisms being utilized by the Awareness system with the other shared operating systems, thus facilitating the integration of the Awareness system and other shared operating systems.

More specifically, it is possible to integrate systems by assembling the conference management softwares of the first embodiment and the Awareness management softwares of the second embodiment in one work station so as to share the parties of inquires and the portion where its set up is obtainable between these systems by making access to the common aspects of the user inquiry mechanism, that is, the description of inquiry information stored as the hard disk data base or the like.

In this way, it is possible to provide the following for the processing system whereby to execute the shared operations:

means for designating the operations required for making inquires with respect to a shared operation; and means for designating the user and group of users who render significance in the designated operations.

Further, means is provided for designating the inquiry process corresponding to the combination of the aforesaid operation and the use and group of users. Thus, with the provision of executing means for the inquiry processes designated by designating means thereof, it is possible to obtain the following effect:

(1) the easier provision of inquiry processing mechanism for the complicated shared operations that may be changeable depending on situations; and (2) the easier provision of the inquiry processing mode most suitable for an arbitrary shared operation.

(Other Modes Embodying the Present Invention)

To an apparatus or a computer in the system to which various devices are connected in order to operate them for the implementation of the functions described in the embodiments described above, the programming codes of the software are supplied to materialize the functions embodying the present invention, and then, each of the aforesaid devices is operated in accordance with the program thus stored in a computer (CPU or MPU) of the system or apparatus. Any embodiments that can be executed in such a manner are included in the scope of the present invention.

Also, in this case, the programming codes themselves of the aforesaid softwares implement the functions embodying the present invention. Therefore, such programming codes themselves, and means for supplying the programming codes to a computer, that is, storage media that store such programming codes, for example, constitute the present invention.

As storage media to store such programming codes, it may be possible to use a floppy disk, hard disk, optical disk, magneto-optic disk, CD-ROM, magnetic tape, nonvolatile memory card, ROM, and others.

Here, it is not only possible to materialize the aforesaid functions embodying the present invention by the computer to which the programming codes are supplied, but also, it is possible to materialize such function by means of the aforesaid programming codes in cooperation with an OS (Operating System) of the computer where the programming codes operate or in cooperation with other application softwares or the like. In such cases, the aforesaid programming codes are of course included in the modes embodying the present invention.

Further, the programming codes thus supplied are stored on the memory provided for the board of the expanded functions of a computer or on the memory provided for the unit of expanded functions connected to a computer, and then, the CPU and others arranged on such board of expanded functions or unit of expanded functions execute the actual processes partly or totally, thus implementing the aforesaid functions embodying the present invention. Such cases are also included in the present invention as a matter of course.

What is claimed is:

1. An information processing apparatus in an information processing system connected to a plurality of terminals, said information processing apparatus comprising:

a main memory storing a software program for implementing an inquiry process relating to an operation to be shared among a plurality of target terminals of the plurality of terminals connected to the information processing system;

a central processing unit for executing the software program stored in said main memory; and a communication bus adapted to communicate information between said main memory, said central processing unit, each of the plurality of terminals of the information processing system, and a storage unit storing information relating to the inquiry process, wherein, when an instruction is received from a requestor terminal, of the plurality of terminals, relating to the operation to be shared among the plurality of target terminals, and the operation requires an inquiry process, said central processing unit obtains from the storage unit information for designating the plurality of target terminals, wherein said central processing unit causes each of the plurality of target terminals to perform the inquiry process, and, based on responses to the inquiry process received from the plurality of target terminals, said central processing unit determines whether the operation can be executed, and wherein the storage unit is accessible by the requestor terminal to change a condition for determining whether the operation can be executed.

2. An information processing apparatus according to claim 1, wherein said central processing unit determines that the operation can be executed when the responses to the inquiry process include at least a number of affirmative responses equal to or greater than a predetermined number indicated in the information relating to the inquiry process stored in the storage unit.

3. An information processing apparatus according to claim 1, wherein said central processing unit causes a display screen of each target terminal to display information relating to the inquiry process.

4. An information processing apparatus according to claim 1, wherein a summary of results of the inquiry process is described in a table.

5. An information processing apparatus according to claim 1, wherein the inquiry process includes inquiries with respect to a communication conference.

6. An information processing apparatus according to claim 5, wherein the inquiries include inquiries relating to commencement and termination of the communication conference.

7. An information processing apparatus according to claim 5, wherein the information stored in the storage unit includes information that designates possible participants in the communication conference as target terminals.

8. An information processing system comprising:

a host apparatus; and a plurality of terminals connected to said host apparatus, wherein said host apparatus comprises:

a main memory storing a software program for implementing an inquiry process relating to an operation to be shared among a plurality of target terminals of said plurality of terminals connected to the information processing system;

a central processing unit for executing the software program stored in the main memory; and a communication bus adapted to communicate information between the main memory, the central processing unit, each of said plurality of terminals, and a storage unit storing information relating to the inquiry process, wherein, when an instruction is received from a requestor terminal, of said plurality of terminals, relating to the operation to be shared among the plurality of target terminals, and the operation requires an inquiry process, the central processing unit obtains from the storage unit information for designating the plurality of target terminals, wherein the central processing unit causes each of the plurality of target terminals to perform the inquiry process, and, based on responses to the inquiry process received from the plurality of target terminals, the central processing unit determines whether the operation can be executed, and wherein the storage unit, is accessible by the requestor terminal to change a condition for determining whether the operation can be executed.

9. An information processing system according to claim 8, wherein the central processing unit determines that the operation can be executed when the responses to the inquiry process include at least a number of affirmative responses equal to or greater than a predetermined number indicated in the information relating to the inquiry process stored in the storage unit.

10. A method of operating an information processing apparatus in an information processing system connected to a plurality of terminals, said method comprising the steps of:

storing, in a main memory, a software program for implementing an inquiry process relating to an operation to be shared among a plurality of target terminals of the plurality of terminals connected to the information processing system;

executing, in a central processing unit, the software program stored in the main memory; and communicating, via a communication bus, information between the main memory, the central processing unit, each of the plurality of terminals of the information processing system, and a storage unit storing information relating to the inquiry process, wherein, when an instruction is received from a requestor terminal, of the plurality of terminals, relating to the operation to be shared among the plurality of target terminals, and the operation requires an inquiry process, said method further comprises the steps of:

the central processing unit obtaining, from the storage unit, information for designating the plurality of target terminals; and the central processing unit causing each of the plurality of target terminals to perform the inquiry process, and, based on responses to the inquiry process received from the plurality of target terminals, the central processing unit determining whether the operation can be executed, wherein the storage unit is accessible by the requestor terminal to change a condition for determining whether the operation can be executed.

11. A method according to claim 10, wherein the central processing unit determines that the operation can be executed when the responses to the inquiry process include at least a number of affirmative responses equal to or greater than a predetermined number indicated in the information relating to the inquiry process stored in the storage unit.

12. A method according to claim 10, wherein the central processing unit causes a display screen of each target terminal to display information relating to the inquiry process.

13. A method according to claim 10, wherein a summary of results of the inquiry process is described in a table.

14. A method according to claim 10, wherein the inquiry process includes inquiries with respect to a communication conference.

15. A method according to claim 14, wherein the inquiries include inquiries relating to commencement and termination of the communication conference.

16. A method according to claim 14, wherein the information stored in the storage unit includes information that designates possible participants in the communication conference as target terminals.

17. A method of operating an information processing system, said method comprising the steps of:

providing a host apparatus;

providing a plurality of terminals connected to the host apparatus;

storing, in a main memory of the host apparatus, a software program for implementing an inquiry process relating to an operation to be shared among a plurality of target terminals of the plurality of terminals connected to the information processing system;

executing, by a central processing unit of the host apparatus, the software program stored in the main memory; and communicating, via a communication bus, information between the main memory, the central processing unit, each of the plurality of terminals, and a storage unit storing information relating to the inquiry process, wherein, when an instruction is received from a requestor terminal, of the plurality of terminals, relating to the operation to be shared among the plurality of target terminals, and the operation requires an inquiry process, said method further comprises the steps of:

the central processing unit obtaining from the storage unit information for designating the plurality of target terminals; and the central processing unit causing each of the plurality of target terminals to perform the inquiry process, and, based on responses to the inquiry process received from the plurality of target terminals, the central processing unit determining whether the operation can be executed, wherein the storage unit is accessible by the requestor terminal to change a condition for determining whether the operation can be executed.

18. A method according to claim 17, wherein the central processing unit determines that the operation can be executed when the responses to the inquiry process include at least a number of affirmative responses equal to or greater than a predetermined number indicated in the information relating to the inquiry process stored in the storage unit.

* * * * *

UNITED STATES PATENT AND TRADEMARK OFFICE
CERTIFICATE OF CORRECTION

PATENT NO. : 6,564,245 B1
DATED : May 13, 2003
INVENTOR(S) : Toshihiko Fukasawa

It is certified that error appears in the above-identified patent and that said Letters Patent is hereby corrected as shown below:

<u>Title page,</u>
Item [56], References Cited, OTHER PUBLICATIONS, "Ssystems" should read -- Systems --; and "Multcomputers" should read -- Multicomputers --.

<u>Column 14,</u>
Line 38, "inquires" should read -- inquiries --.

<u>Column 16,</u>
Line 47, "unit," should read -- unit --.

Signed and Sealed this

Eighteenth Day of November, 2003

JAMES E. ROGAN
*Director of the United States Patent and Trademark Office*